United States Patent
Quach et al.

(10) Patent No.: US 11,250,396 B2
(45) Date of Patent: Feb. 15, 2022

(54) SYSTEM AND METHOD FOR PROVIDING AN ACTION-BASED DONATION PLATFORM

(71) Applicants: Nam C. Quach, San Francisco, CA (US); Charlene Chen, San Francisco, CA (US)

(72) Inventors: Nam C. Quach, San Francisco, CA (US); Charlene Chen, San Francisco, CA (US)

( * ) Notice: Subject to any disclaimer, the term of this patent is extended or adjusted under 35 U.S.C. 154(b) by 57 days.

(21) Appl. No.: 16/138,727

(22) Filed: Sep. 21, 2018

(65) Prior Publication Data

US 2019/0095881 A1  Mar. 28, 2019

Related U.S. Application Data

(60) Provisional application No. 62/562,341, filed on Sep. 22, 2017.

(51) Int. Cl.
*G06Q 20/08* (2012.01)
*G06F 3/0482* (2013.01)
(Continued)

(52) U.S. Cl.
CPC .......... *G06Q 20/08* (2013.01); *G06F 3/0488* (2013.01); *G06F 3/04817* (2013.01); *G06Q 20/322* (2013.01); *G06F 3/0482* (2013.01)

(58) Field of Classification Search
CPC ..... G06F 3/0482; G06F 3/0481; G06Q 20/08; G07F 9/023
See application file for complete search history.

(56) References Cited

U.S. PATENT DOCUMENTS 5,909,794 A * 6/1999 Molbak ............... G07D 3/16
                                                        194/216
10,467,663 B1 * 11/2019 Ocampo ........ G06Q 30/0279
(Continued)

FOREIGN PATENT DOCUMENTS

KR      20130082987 A  *  7/2013

OTHER PUBLICATIONS

Vela et al. Feeding Your Piggy Bank with Intentions: A Study on Saving Behaviour, Saving Strategies, and Happiness. Proceedings of the Colors of Care: The 9th International Conference on Design & Emotion. Bogotá, Oct. 6-10, 2014. (Year: 2014).*
(Continued)

*Primary Examiner* — Virpi H Kanervo
(74) *Attorney, Agent, or Firm* — Morrison & Foerster LLP

(57) ABSTRACT

The present disclosure generally relates to a system and method for providing an action-based donation platform. An exemplary electronic device displays a plurality of graphical representations corresponding to a plurality of activities and displays a first graphical representation corresponding to a contribution goal. The electronic device receives a user input specifying an activity and a contribution amount corresponding to an instance of the activity. Based on the user input, the electronic device adds a second graphical representation corresponding to the specified activity to the plurality of graphical representations. The electronic device receives a user selection of the second graphical representation, and in response to receiving the user selection of the second graphical representation, displays an indication of a contribution corresponding to the contribution goal.

20 Claims, 9 Drawing Sheets

(51) Int. Cl.
*G06F 3/0481* (2013.01)
*G06F 3/0488* (2013.01)
*G06Q 20/32* (2012.01)

(56) References Cited

U.S. PATENT DOCUMENTS

| | | | |
|---|---|---|---|
| 10,564,800 B2* | 2/2020 | Cooper | G06F 3/0482 |
| 2004/0067469 A1* | 4/2004 | Rogan | G09B 7/00 |
| | | | 434/107 |
| 2007/0198561 A1* | 8/2007 | Lee | G06F 16/168 |
| 2012/0274664 A1* | 11/2012 | Fagnou | E21B 41/00 |
| | | | 345/660 |
| 2013/0167091 A1* | 6/2013 | Klappert | G06F 3/0482 |
| | | | 715/849 |
| 2015/0067559 A1* | 3/2015 | Missig | G06F 3/04883 |
| | | | 715/765 |
| 2019/0347733 A1* | 11/2019 | Sasaki | G06Q 40/06 |
| 2020/0058150 A1* | 2/2020 | Kuhn | G06F 3/0481 |

OTHER PUBLICATIONS

Michael Ganson Ballard. Win/Win Charitable Virtual and Physical Slot Machines. A thesis document submitted in partial fulfillment of the requirements for the degree of Master of Fine Arts in Design and Technology Parsons The New School for Design. May 2010. (Year: 2010).*

J. Defazio, T. Faas and R. Finch, "Building multi-user virtual worlds," Proceedings of CGAMES'2013 USA, 2013, pp. 132-137, doi: 10.1109/CGames.2013.6632619. (Year: 2013).*

* cited by examiner

SYSTEM AND METHOD FOR PROVIDING AN ACTION-BASED DONATION PLATFORM

FIELD OF THE INVENTION

This application claims priority to U.S. Provisional Patent Application Ser. No. 62/562,341, filed Sep. 22, 2017, entitled "SYSTEM AND METHOD FOR PROVIDING AN ACTION-BASED DONATION PLATFORM", the content of which is hereby incorporated by reference for all purposes.

FIELD OF THE INVENTION

The present disclosure relates generally to computer user interfaces, and more specifically to a system and method for providing an action-based donation platform.

BACKGROUND

Traditionally, the act of making a donation is a singular event that does not affect the daily activities of the individual that made the donation. For instance, if an individual would like to donate to a non-profit organization, the act of donating involves simply contacting the charity and making a payment (e.g., via a credit card or a check). The payment, however, does not alter the user's behavior and relationships in a significant manner.

Additionally, traditional methods for making a donation can be burdensome for the individual donor. For each donation, the individual donor needs to identify a cause that is personally meaningful among a myriad of potential candidates and make the donation per procedures dictated by the cause (e.g., visiting the corresponding hosting website, using the acceptable payment method). As such, the individual donor must dedicate a non-trivial amount of time and effort to make a single donation. Further still, the act of making a donation is traditionally not a social and interactive activity. While multiple people may make donations to the same cause, the multiple donors do not communicate or interact with each other regularly in making the donations.

The above-described shortcomings of a traditional donation platform lead people to make donations infrequently, or not at all, rather than making regular donations to multiple charitable causes that they find meaningful. As such, the traditional donation platform results in lost opportunities for individuals who have the means and desire to donate, as well as the entities in need and the organizations/businesses that are interested in sponsoring charitable activities.

BRIEF SUMMARY

Described herein are systems methods for providing an action-based donation platform. Using an action-based donation platform, an individual user can associate an activity that is beneficial/meaningful to the user (e.g., drink less coffee, running) with a contribution of a certain size to one or more contribution goals. Furthermore, the platform provides a natural and streamlined user interface for the user to track performance of the user-specific activity, accumulate the resulting contributions, identify charitable causes, and make donations. The platform also provides mechanisms for allowing a user to interact with other users of the platform and to receive motivation and encouragement to continue performing the user-specific activities and making donations regularly. Accordingly, the action-based donation platform empowers the user to make positive changes to his or her daily life (which ultimately leads to fulfillment of long-term goals, correction of bad habits, and personal transformation), foster relationships with others, and cultivate communities. With an increasing amount of donations and an increasing level of engagement from the individual users, the action-based donation platform also benefits the entities in need, the hosting organizations, and the business sponsors. By harnessing the power of individuals' innate generosity of giving and innate desire to do good, think good, and achieve good, the action-based donation platform provides both short-term and long-term benefits to the individual and the society.

In some embodiments, a computer-implemented method comprises: at an electronic device with a display, displaying a plurality of graphical representations corresponding to a plurality of activities; displaying a first graphical representation corresponding to a contribution goal; receiving a user input specifying an activity and a contribution amount corresponding to an instance of the activity; based on the user input, adding a second graphical representation corresponding to the specified activity to the plurality of graphical representations; receiving a user selection of the second graphical representation; in response to receiving the user selection of the second graphical representation, displaying an indication of a contribution corresponding to the contribution goal, wherein a size of the contribution is based on the contribution amount specified by the user input.

In some embodiments, an electronic device comprises a display; one or more processors; a memory; and one or more programs. The one or more programs are stored in the memory and configured to be executed by the one or more processors, and the one or more programs include instructions for: displaying a plurality of graphical representations corresponding to a plurality of activities; displaying a first graphical representation corresponding to a contribution goal; receiving a user input specifying an activity and a contribution amount corresponding to an instance of the activity; based on the user input, adding a second graphical representation corresponding to the specified activity to the plurality of graphical representations; receiving a user selection of the second graphical representation; in response to receiving the user selection of the second graphical representation, displaying an indication of a contribution corresponding to the contribution goal, wherein a size of the contribution is based on the contribution amount specified by the user input.

In some embodiments, a non-transitory computer-readable storage medium stores one or more programs. The one or more programs comprising instructions, which when executed by one or more processors of an electronic device having a display, cause the electronic device to: display a plurality of graphical representations corresponding to a plurality of activities; display a first graphical representation corresponding to a contribution goal; receive a user input specifying an activity and a contribution amount corresponding to an instance of the activity; based on the user input, add a second graphical representation corresponding to the specified activity to the plurality of graphical representations; receive a user selection of the second graphical representation; in response to receiving the user selection of the second graphical representation, display an indication of a contribution corresponding to the contribution goal, wherein a size of the contribution is based on the contribution amount specified by the user input.

DESCRIPTION OF THE FIGURES

For a better understanding of the various described embodiments, reference should be made to the Description of Embodiments below, in conjunction with the following drawings in which like reference numerals refer to corresponding parts throughout the figures.

DETAILED DESCRIPTION

Figure 1:
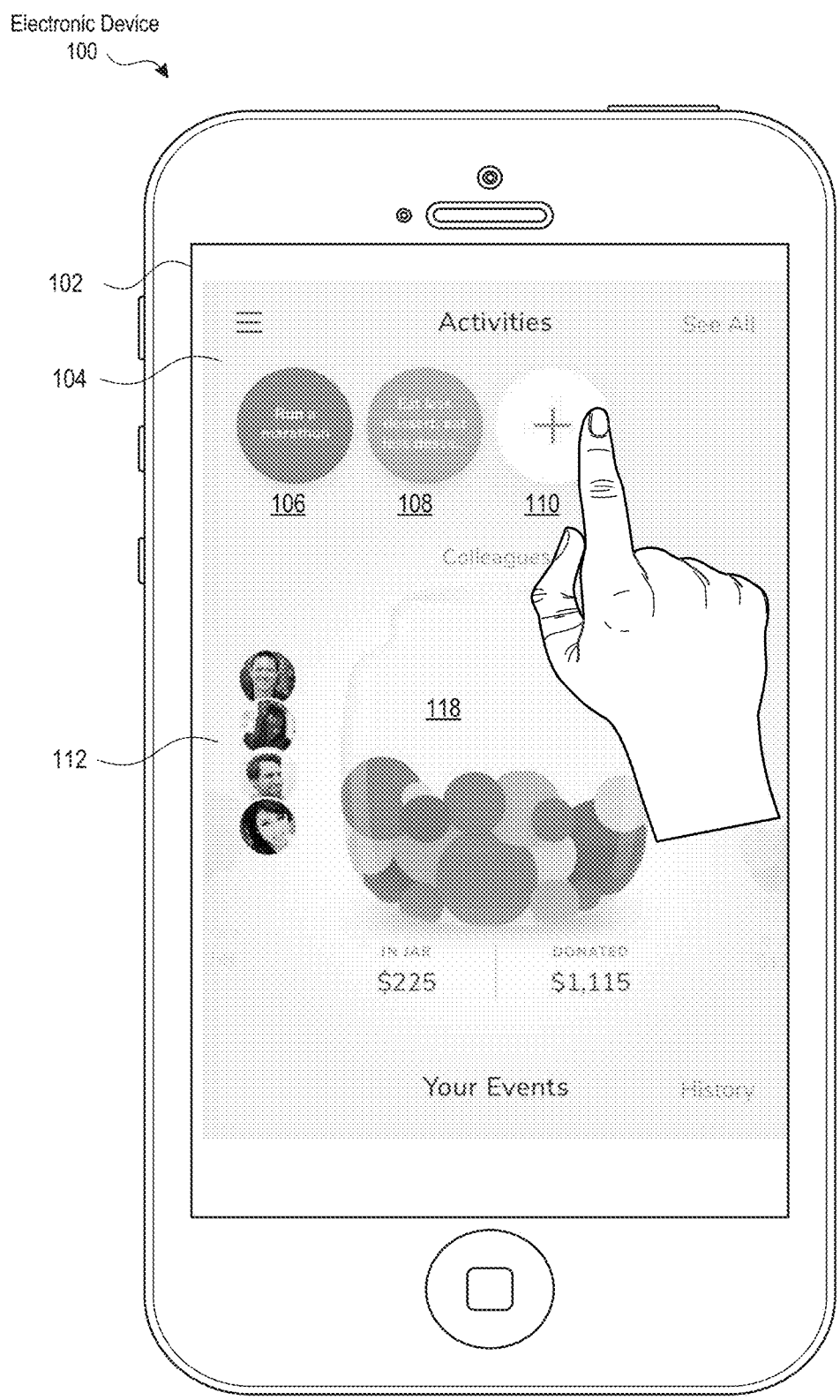
FIG. 1 depicts an exemplary user interface of an electronic device in accordance with some embodiments.

As discussed above, there is a need for electronic devices that provide efficient methods and user interfaces for allowing an individual user to make donations by performing user-specific actions that may be meaningful and/or beneficial to the user. For example, the desired electronic device allows an individual user to establish an association between a particular activity that is beneficial or meaningful to the user (e.g., eating less sugar, drinking a small cup of coffee rather than a large cup) and a charitable act (e.g., committing to making a donation of a certain size). Further, the desirable electronic device provides user interfaces for encouraging the individual user to take the particular beneficial and/or meaningful action regularly and allow the individual user to track previous performances of the particular activity, identify desirable charitable causes, make donations to the desirable charitable causes, and engage with other users to reach charitable goals in a natural, streamlined, and efficient manner.

Electronic device and/or techniques as described above can reduce the burden on the user who strives to regularly take specific actions and contribute to charitable causes, thereby enhancing productivity. Further, such electronic device and/or techniques can reduce processor and battery power otherwise wasted on redundant user inputs. It should be appreciated that, without such electronic device and/or techniques, the burden otherwise placed on the user to track activities, identify desired causes, make desired donations, and coordinate efforts with other people often discourages the user from participating in charitable events regularly, or at all.

In general, the action-based donation platform allows interaction among three types of users: individual users, event drivers, and sponsors. For individual users, the platform provides natural and intuitive interfaces for user to make donations by performing user-specific actions and to foster relationships by interacting with other individual users, event drivers, and sponsors, as described with reference to FIGS. 1-5. For event drivers, the platform provides user interfaces to create, publicize, and manage charitable events. For sponsors, the platform provides user interfaces to sponsor events for event drivers and provide rewards to individual users, thereby creating and/or improving brand name of the sponsor. Event drivers and sponsors may be individuals, groups, and/or organizations.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIGS. 1-6 illustrate exemplary techniques including exemplary user interfaces ("UI") for providing an action-based donation platform in accordance with some embodiments. These figures are also used to illustrate the processes described below, including the process in FIG. 7.

FIGS. 1-5 show electronic device 100. The electronic device 100 may be device 800 in FIG. 8 in some embodiments. In the illustrated examples, the electronic device 100 is a mobile phone having a mobile application, which is associated with the action-based donation platform. While the illustrated examples are described herein with reference to electronic device 100, it will be appreciated that a variety of electronic devices, such as laptops, desktops, tablets, wearable/portable devices, and home electronics including televisions and speakers, can be used in other implementations.

The electronic device 100 provides user interfaces for an individual user to make action-based donations. With reference to FIG. 1, the electronic device 100 displays a graphical user interface 104 corresponding to a mobile application on a display screen, such as touch-sensitive display screen 102. The graphical user interface 104 includes a plurality of graphical representations corresponding to a plurality of activities specific to the individual user. In the depicted example, the graphical user interface 104 includes, in the top portion, icon 106 and icon 108 respectively corresponding to the user-specific activities "Run a marathon" and "Eat less dessert". The plurality of displayed activities have been previously associated with charitable acts by the user, for example, via the user interface 120 (FIG. 2) described below. It should be appreciated that, if the user has not previously associated any activity with a charitable act, the user interface 104 does not include icon 106 and icon 108.

The user interface 104 includes a graphical representation 118 corresponding to a contribution goal. The user can make contributions to the contribution goal by performing user-specific activities previously associated with charitable acts, as described below. In the depicted example, the graphical representation 118 is displayed below the icons 106 and 108 and includes a graphical depiction of a container (more specifically, a jar).

A contribution goal can be associated with an individual user or with multiple individual users. In the depicted example in FIG. 1, the contribution goal is associated with multiple colleagues as indicated by the icon group 112. Accordingly, each colleague represented by the icon group 112 can make contributions toward the contribution goal by performing activities specific to the particular colleague. In some examples, each individual user is associated with a respective user account of the donation platform. To create a goal having multiple users, an individual user can create the goal using his or her account and send invitations to other user accounts to join the goal.

In some examples, the electronic device 100 allows an individual user to have multiple contribution goals. For example, the electronic device 100 can display a row of graphical representations (e.g., jars) corresponding to the multiple goals in the user interface 104, and the user can swipe right or left to bring a particular graphical representation in view and/or in focus to make contribution to the corresponding contribution goal.

In some examples, the multiple contribution goals can be associated with different sets of users. For example, the electronic device 100 can allow the user to set up a first goal associated with the user himself/herself (e.g., represented by a first jar), a second goal associated with the user's family (e.g., represented by a second jar), and a third goal associated with the user's colleagues (e.g., represented by a third jar). The electronic device 100 can restrict the number and/or type of contribution goals that an individual user can have.

The user interface 104 includes a graphical representation 110 for creating a new user-specific activity. With reference to FIG. 1, the electronic device 100 receives a selection of the graphical representation 110 (e.g., via a touch input). In response, the electronic device 100 displays user interface 120 (FIG. 2).

Figure 2:
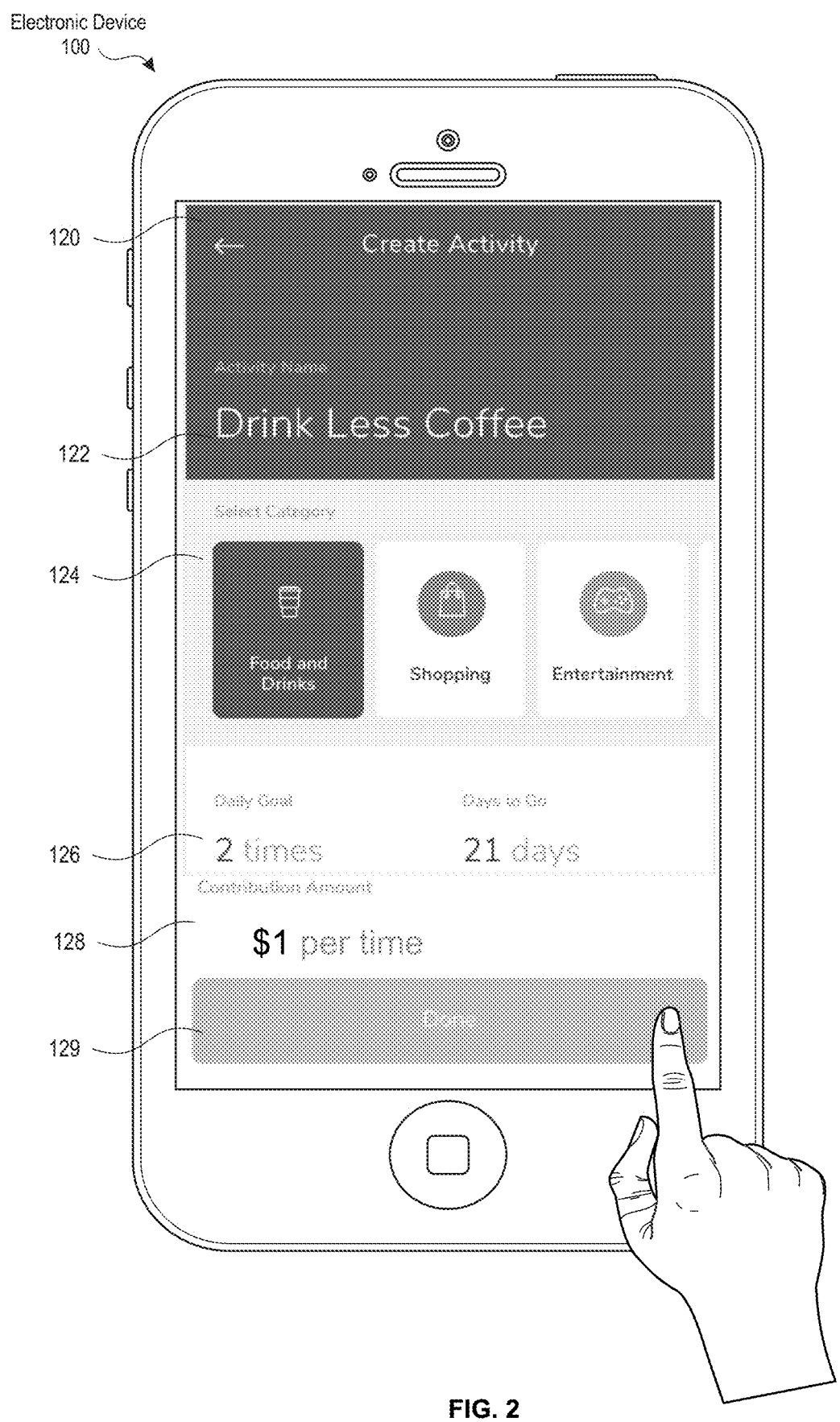
FIG. 2 depicts an exemplary user interface of an electronic device in accordance with some embodiments.

With reference to FIG. 2, the user interface 120 allows the user to specify the new activity. The activity can involve an action (e.g., drink less coffee, wash the dog, brush teeth, get an A in a class, writing a book, say "I love you", say "I appreciate you", laugh out loud, recycle) or a lack of action (e.g., do not eat fast food, do not wear make-up, do not play video games, smoke no more than 5 cigarettes every day). Further, the activity can be associated with a predefined category (e.g., food and drinks, shopping, entertainment), a duration/time period during which the action is tracked by the platform (e.g., in the next 30 days, for a week) and/or a frequency (e.g., every day, every week, every month, 10 times a day). In the depicted example, the user interface 120 provides input field 122 for specifying an activity name (e.g., "Drink Less Coffee"), graphical affordance 124 for specifying a category of the activity, input fields 126 for specifying a target frequency of the activity (e.g., "2 times daily") and for specifying a target time period during which the activity is tracked (e.g., "21 days").

The user interface 120 also allows the user to associate the activity with a charitable act. A charitable act can involve making a contribution (e.g., of a certain monetary sum) to one or more contribution goals for each instance of the activity. An instance of the activity refers to an occurrence of an action (e.g., the user has bought a small coffee) or a non-action (e.g., the user has refrained from eating candy for a whole day). In the depicted example, the user interface 120 provides input field 128 for specifying the monetary sum that will be contributed for an instance of the activity "Drink Less Coffee". The user interface 120 also provides a software button 129 for confirming the association between the specified activity and the specified charitable act.

After the electronic device 100 receives user input(s) specifying an activity and a contribution amount corresponding to an instance of the activity, the electronic device adds a graphical representation corresponding to the specified activity to the plurality of graphical representations displayed on the user interface 104. As depicted in FIG. 2, the electronic device 100 receives a touch input on the software button 129, which specifies an activity ("Drink Less Coffee") and a contribution amount corresponding to an instance of the activity ("$1 per time"). That is, the user intends to commit to donate $1 every time he/she successfully refrains from drinking a certain amount of coffee. Based on touch input, the electronic device 100 adds an icon 130 ("Less Coffee") corresponding to the specified activity adjacent to the icon 108 on the user interface 104, as depicted in FIG. 3A.

It should be appreciated that, after adding the new icon 130 ("Less Coffee") to the user interface 104, the electronic device 100 allows the user to create still additional associations between new activities and charitable acts. As depicted in FIG. 3A, the user interface 104 displays, adjacent to the newly added icon 130, the graphical representation 110 for creating a new user-specific activity. Accordingly, if the user selects the graphical representation 110 for a second time, the electronic device 100 can display the user interface 120 (FIG. 2) and can receive a second user input specifying a second activity and a second contribution amount corresponding to an instance of the second activity. Based on the second user input, the electronic device 100 can add a new icon corresponding to the second activity to the top portion of the user interface 104 (e.g., between the icon 130 and the graphical representation 110).

Figure 3B:
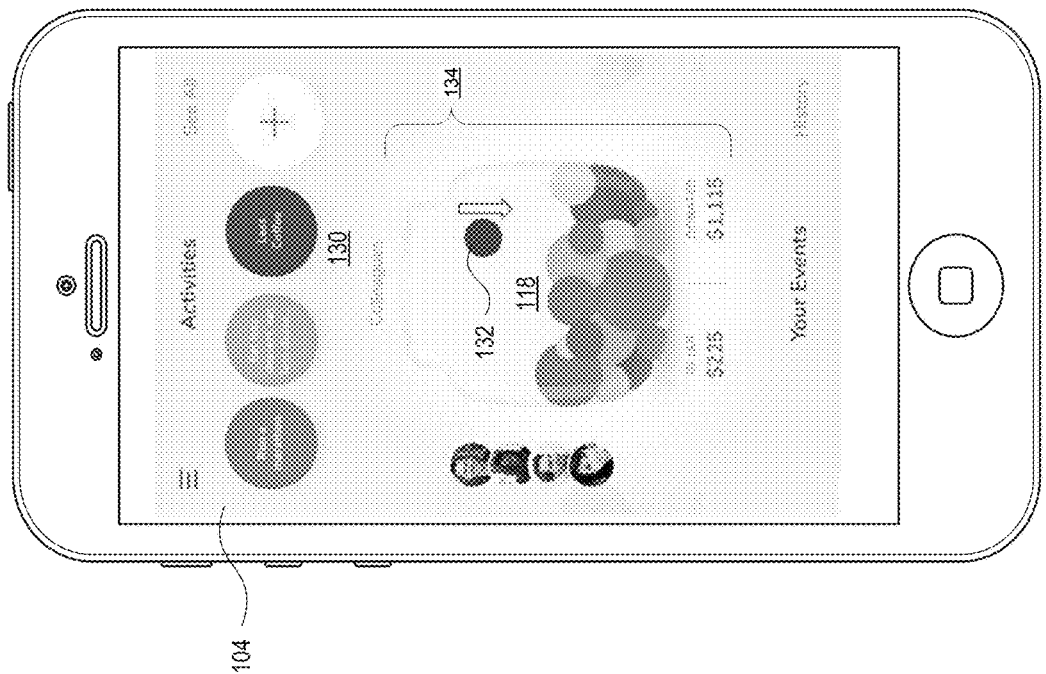
FIG. 3B depicts exemplary user interfaces of an electronic device in accordance with some embodiments.
Figure 3A:
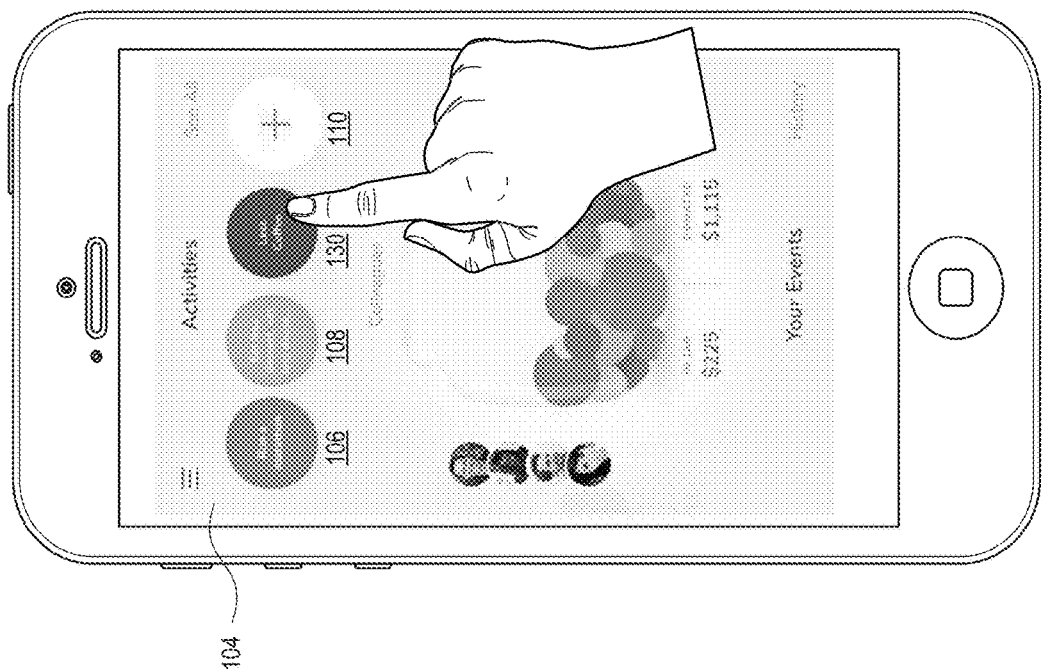
FIG. 3A depicts exemplary user interfaces of an electronic device in accordance with some embodiments.

FIGS. 3A-B illustrate exemplary techniques including exemplary UI for allowing a user to make contributions toward a contribution goal. Specifically, the electronic device 100 allows the user to log performance of user-specific activities by selecting the graphical representation corresponding to the user-specific activity. With reference to FIG. 3A, the electronic device 100 receives a touch input selecting icon 130 ("Less Coffee") displayed on the user interface 104. The user selection indicates that the user has performed an instance of the user-specified activity (e.g., the user just bought a small cup of coffee instead of his/her usual large cup of coffee).

In response to receiving the user selection of icon 130, the electronic device 100 displays an indication of a contribution made toward to a contribution goal. In some examples, the indication of a contribution includes an animation of an object representing the contribution moving from the graphical representation of the activity toward the graphical representation of the contribution goal. As depicted in FIG. 3B, the electronic device 100 displays an animation of a coin 132 dropping from the top portion of the user interface into the graphical representation 118. The size of a contribution is based on the contribution amount specified by the user with respect to the activity. In the depicted example, the size of the contribution is $1 as specified by the user shown in FIG. 2.

In some examples, the appearance of the coin 132 is based on the contribution amount specified by the user with respect to the activity. As shown in FIG. 3B, the relative size of the coin 132 reflects the size of the contribution amount of the activity "Less Coffee" relative to other user-specified activities. In some examples, the appearance of the coin 132 is based on the appearance of the graphical representation of the selected activity. As shown in FIG. 3B, the coin 132 is in the same color as the selected icon 130.

In some examples, when the amount of contributions made to a contribution goal is approaching a certain size (e.g., a size that is close to but smaller than the maximum capacity of the contribution goal), the electronic device 100 provides an indication to the user. Specifically, in response to receiving a user selection of an activity icon (resulting in a contribution to a contribution goal), the electronic device 100 can determine whether the current amount associated with the contribution goal meets a first threshold. The first threshold can be an absolute number (e.g., $90), a percentage of the maximum capacity of the contribution goal (e.g., 90%), or a combination thereof. In accordance with a determination that the current amount meets the first threshold, the electronic device provides an indication accordingly. For example, the indication includes an animation of the jar pulsating for a period of time while/after the coin drops into the jar and/or a message ("Your jar is almost full. Make a donation to make more space!"). In accordance with a determination that the current amount does not meet the first threshold, the electronic device 100 displays a different indication. For example, the electronic device 100 shows the coin dropping into the jar, which remains stationary.

In some examples, when the amount of contributions made to a contribution goal reaches or exceeds the maximum capacity of the contribution goal, the electronic device 100 provides an indication to the user. Specifically, in response to receiving a user selection of an activity icon (resulting in a contribution to a contribution goal), the electronic device 1000 determines whether the current amount associated with the contribution goal meets a second threshold. The second threshold can be an absolute number (e.g., $100), a percentage of the maximum capacity of the contribution goal (e.g., 100%), or a combination thereof. In accordance with a determination that the current amount meets the second threshold, the electronic device provides a prompt for a donation. For example, the prompt can include a message such as "Your jar is full. Please make a donation before making more contributions." In some examples, the electronic device 100 rejects the most recent contribution (i.e., subtracting the recent contribution from the current amount of the contribution goal). In accordance with a determination that the current amount does not meet the second threshold, the electronic device 100 displays an indication that a contribution is successfully made (e.g., a coin drops into the jar).

In some examples, the electronic device 100 allows the user to select a contribution goal from a plurality of contribution goals before making a contribution. For example, the user can swipe right or left in the region 134 (FIG. 3B) to bring the graphical representation of a particular contribution goal in view and/or in focus, and then selects an activity icon to make a contribution. Accordingly, the electronic device 100 displays an indication that the contribution has been made with respect to the particular contribution goal in focus.

Figure 4B:
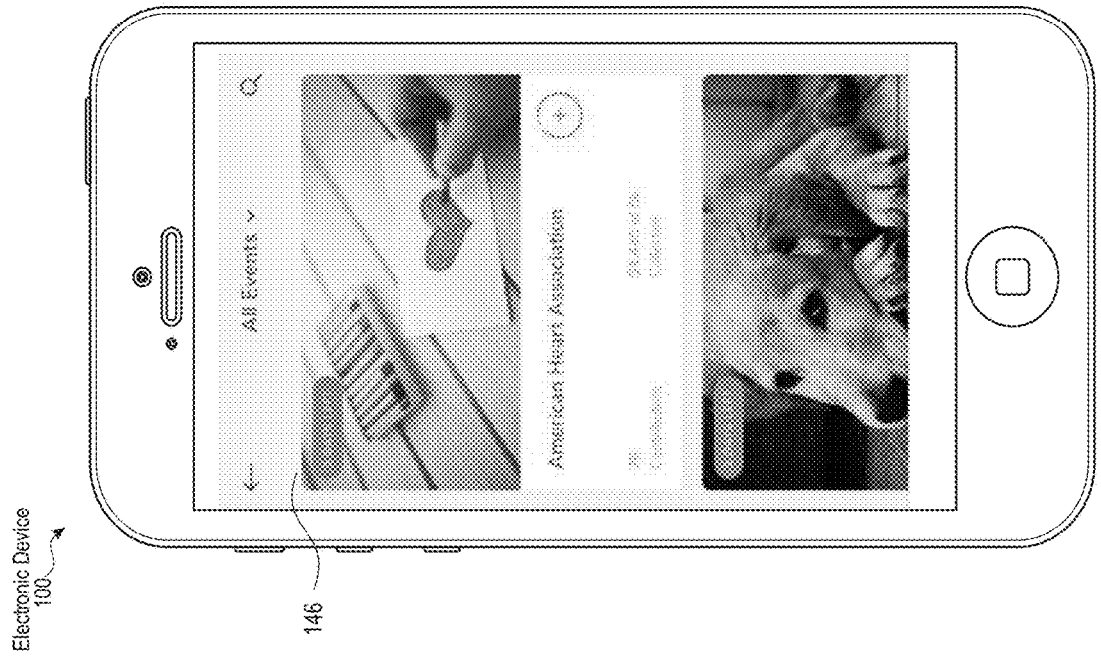
FIG. 4B depicts exemplary user interfaces of an electronic device in accordance with some embodiments.
Figure 4A:
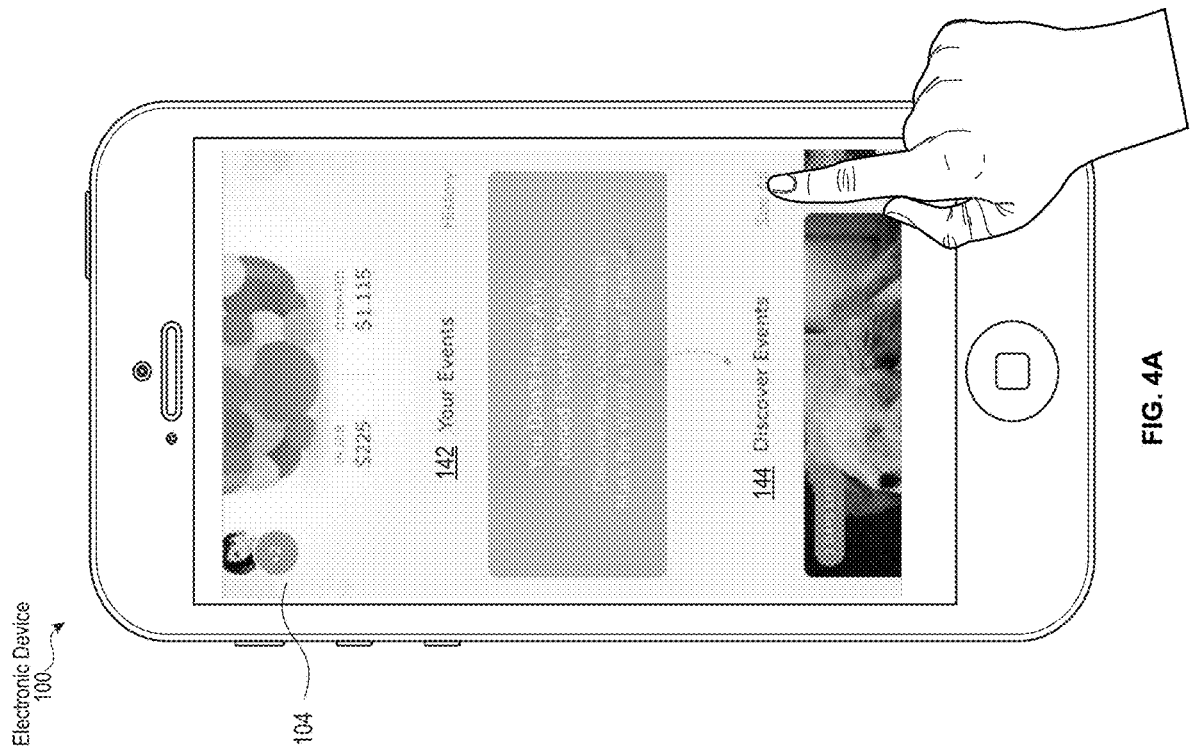
FIG. 4A depicts exemplary user interfaces of an electronic device in accordance with some embodiments.

FIGS. 4A-D illustrate exemplary techniques including exemplary UI for allowing a user to identify and join "events". Generally, an event represents opportunities for the user to make donations to an entity such as an individual, a group, an organization, and/or an occasion. FIG. 4A depicts an exemplary UI for allowing the user to engage with events. As depicted, the user interface 104 shows a section 142 ("You Events") for displaying the events that the user has previously joined and a section 144 ("Discover Events") for discovering potential events to join. In the depicted example, the sections 142 and 144 are located below the graphical representation of a contribution goal. Thus, the user can scroll down the user interface 104 to bring section 142 and section 144 into view. It should be appreciated that the sections 142 and 144 can be displayed in user interface(s) different from the user interface 104, in some examples.

As depicted to FIG. 4A, the electronic device 100 receives a user input selecting a link "See All" in the section 144 ("Discovery Events"). In response, the electronic device 100 displays user interface 146 for displaying all of the potential events that the user can join, as shown in FIG. 4B. In some examples, the electronic device 100 displays event(s) based on one or more settings associated with the user, such as the user's preferences, past activities, and invitations received. In some examples, the events are pre-associated with different tags and/or categories (e.g., social, children, environment, animals, health, personal). In some examples, the events can be sorted, filtered, and/or searched (e.g., based on key words or unique event codes). In some examples, upon a user selection of a particular event, the electronic device 100 provides additional information on the particular event, such as purpose of the event, duration of the event, donation goal of the event, progress made, number of contributors, creator(s) of the event, and/or sponsor(s) of the event. The electronic device 100 further provides one or more UI affordances to allow the user to express interest in joining the event (e.g., displaying software button "Join").

Figure 4D:
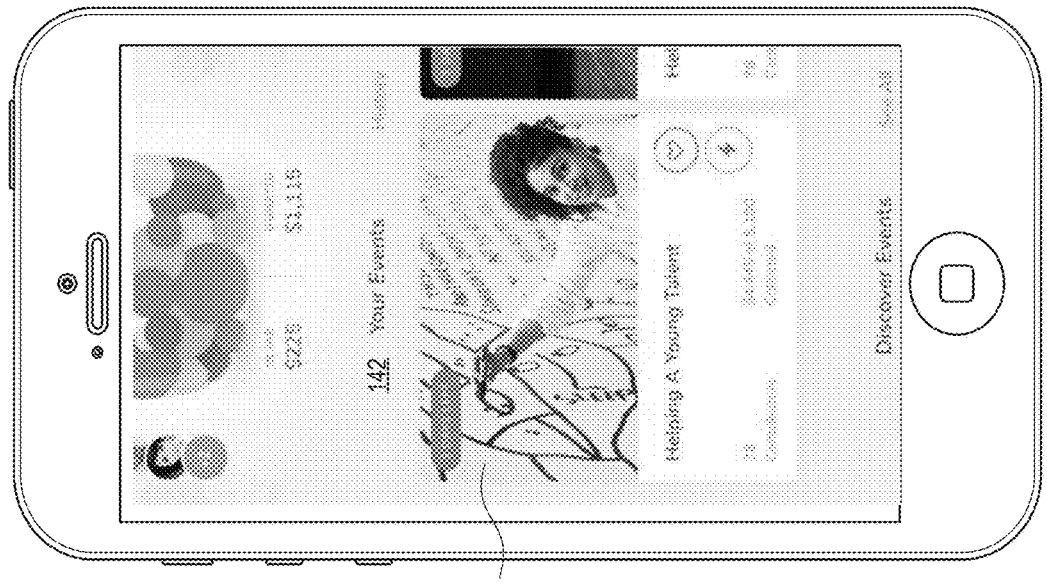
FIG. 4D depicts exemplary user interfaces of an electronic device in accordance with some embodiments.
Figure 4C:
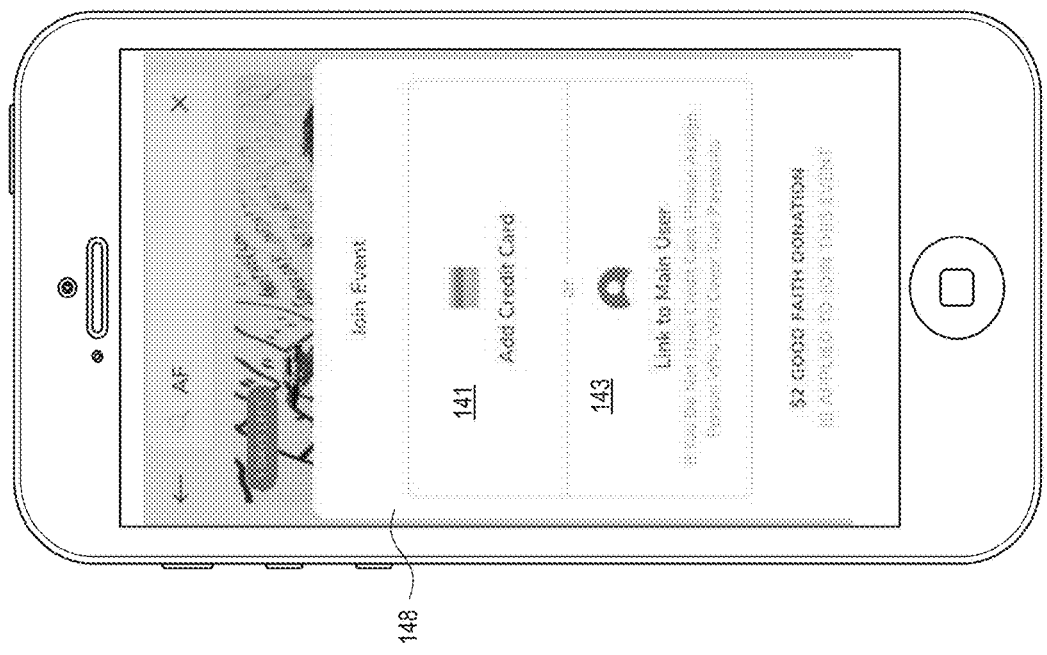
FIG. 4C depicts exemplary user interfaces of an electronic device in accordance with some embodiments.

With reference to FIG. 4C, when the user expresses interest in joining an event, the electronic device 100 provides user interface 148 to prompt for the necessary information. In the depicted example, the user interface 148 includes a UI affordance 141 for adding payment information and a UI affordance 143 for linking to another user (whose payment information will be used to make donations). It should be appreciated that, if the user has previously provided payment information and/or linked his/her account to other users, the user interface 148 may indicate the payment information and/or linked users accordingly. In some examples, the user must also meet one or more requirements (e.g., make an initial good-faith donation) before being permitted to join the event. After the user provides the necessary information and/or performs the necessary steps to join the event, a graphical representation 150 of the successfully added event is displayed in the section 142 ("Your Events") in the user interface 104, as shown in FIG. 4D. In some examples, the electronic device 100 can restrict the number of events that a user can join.

Figure 5B:
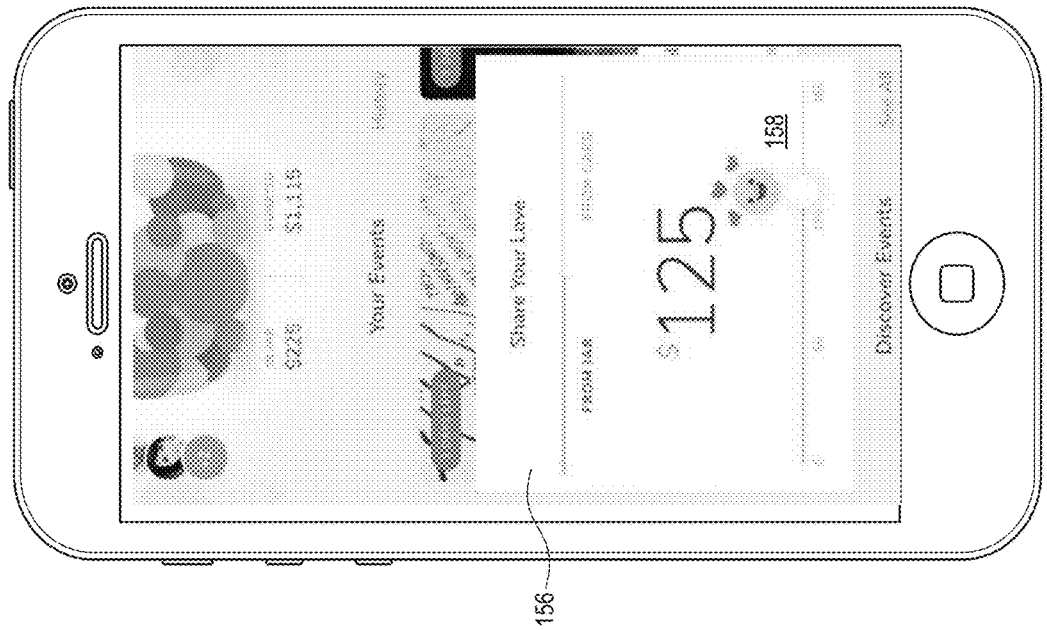
FIG. 5B depicts exemplary user interfaces of an electronic device in accordance with some embodiments.
Figure 5A:
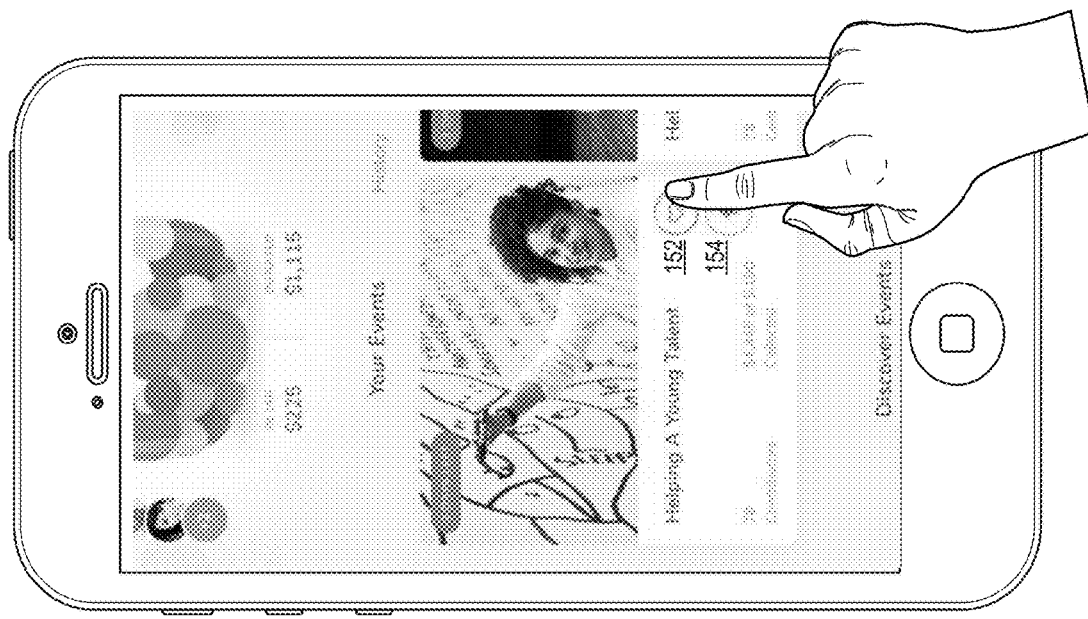
FIG. 5A depicts exemplary user interfaces of an electronic device in accordance with some embodiments.

FIGS. 5A-B illustrate exemplary techniques including exemplary UI for allowing a user to make a donation to an event. With reference to FIG. 5A, the electronic device 100 displays an UI affordance 152 and an UI affordance 154 corresponding to an added event ("Helping A Young Artist"). The UI affordance 152 allows the user to make a donation from previous contributions to the user's contribution goals (which, as discussed above, are accumulated as a result of logging performances of user-specific activities). The UI affordance 154 allows the user to make a donation using a payment card such as a credit card.

As depicted in FIG. 5A, the electronic device 100 receives a user input selecting the UI affordance 152. In response to the user input, the electronic device 100 displays user interface 156 (FIG. 5B). The user interface 156 includes an UI affordance 158, which allows the user to specify a donation amount up to the amount available for donation based on the user's previous contributions. In some examples, the user interface 156 allows the user to specify particular contribution goal(s) to making the donation from.

In some examples, after receiving user input(s) specifying a donation amount and a target event to make the donation to, the electronic device 100 decrements the current amount associated with the contribution goal with the donation amount and increments the amount associated with the event with the donation amount. For example, if the user donates $125 from his/her colleague jar to the event "Helping A Young Talent", the electronic device 100 subtracts $125 from the current amount associated with the colleague jar and adds $125 to the amount associated with the event. In some examples, the electronic device 100 displays an indication that a donation corresponding to the contribution goal is made, for example, by displaying an animation showing that part of the colleague jar is emptied.

In some examples, the user's payment card is charged when the user makes a donation to an event. For example, the user's credit card is charged $125 when the user confirms a donation to the event "Helping A Young Talent". In some examples, the user's payment card is charged when the user makes a contribution to a contribution goal, instead of being charged when the user makes a donation at a later time. For example, the user's credit card is charged $1 when the user selects the activity icon "Less Coffee" to make a contribution to the colleague contribution goal.

In some examples, the electronic device 100 allows a first user (e.g., a child) to link his or her account to a second user (e.g. a parent) so that the first user can make donations using the payment information associated with the second user (e.g., the parent's credit card). Additionally or alternatively, the electronic device 100 can allow the first user to link a specific activity, a specific contribution goal, a specific event, and/or a specific donation to the second user. When a first user would like to make a donation using payment information associated with a linked second user (e.g., by providing a user input in the user interface 156 on the first user's electronic device), the second user's electronic device provides a prompt for authorizing the donation amount. For example, the second user's electronic device can display a message "User Julie Garett linked to you has donated $125 to Helping A Young Talent" and provide UI affordances to accept or decline the donation. When the second user accepts or declines the donation, the first user's electronic device provides a notification accordingly.

In some embodiments, the platform provides user interfaces to allow the user to tip the platform. For example, every time the user makes a donation, the platform can prompt the user to provide a tip as a percentage of the donation before letting the user confirm the donation (e.g., via a list of icons representing 10%, 15%, 20% or a custom percentage of the donation).

The action-based donation platform provides various features to encourage individual users to perform the user-specific activities regularly and stay motivated. In some examples, the platform provides user interfaces for reporting user-specific analytics data, such as the number of times the user has performed a particular activity, the frequency of past performances, information about the user's most recent contribution (e.g., time, amount), and the amount of contributions made (e.g., a raw number representing the user's total contribution to date, a graph showing the contribution amounts corresponding to different time periods). In some embodiments, the platform provides user interfaces for reporting the above-described analytics data related to a group of users (e.g., a group of users contributing to the same goal, all of the users in a geographical region, all of the users on the platform).

In some examples, the platform provides notifications (e.g., a message "You haven't performed your activity 'Less Coffee' for a while", a message "You have 2 months left to finish your book") to the individual user if the individual user has not recorded performance of a particular activity for a predetermined period of time and/or at a predetermined frequency, so as to remind and encourage the user to perform the activity. The platform can provide notification in a similar manner when the user has been inactive with respect to a particular goal and the platform overall (e.g., the user has not launched the mobile application for a predetermined period of time). The notification can be via email, via user interfaces of the mobile application, and/or via user interfaces of the operating system of the electronic device.

In some examples, the platform prompts the user to update his or her user-specific activity based on past performance of the activity. If the user has not recorded performance of a particular activity for a predetermined period of time and/or at a predetermined frequency, the platform may prompt the user to relax parameters associated with the activity. For example, if the user fails to finish writing a book within the target duration, the platform may prompt the user to reset the target duration (e.g., a message "Would you like to reset the time period for finishing your book?"). On the other hand, if the user has successfully performed the activity within a predetermined period of time and/or at a predetermined frequency, the platform may prompt the user to perform the activity faster and/or more frequently. For example, if the user has successfully refrained from smoking more than 5 cigarettes every day for a week, the platform may prompt the user to aim for smoking no more than 2 cigarettes every day ("e.g., a message "Would you like to try smoking even less next week?"). As another example, if the user has successfully worked out twice a week, the platform may prompt the user to aim for working out five times a day. Using positive reinforcement/conditioning, the platform helps the user to fulfill aspirations and correct bad habits over time.

The platform can also include game features to encourage user participation, for example by providing rewards (e.g., "virtual badges", coupons) to an individual user for performing certain activities at a certain pace/frequency or for donating to certain events. The platform can also offer upgrades in user interfaces (e.g., look of the jar icon, sound effects) based on the user's past activities. The various rewards and upgrades may be furnished by event drivers or sponsors. In some examples, the platform provides messaging capabilities such that individual users, sponsors, and event drivers can share information using the platform. For example, the platform may automatically create a message thread for individuals associated to the same contribution goal such that the individual users can coordinate their effort.

In some embodiments, the action-based donation platform provides user interfaces so that an individual user can enter personal reflections on his or her goals and activities undertaken to meet the goals, or the lack thereof. The user interfaces can include multiple-choice questions, open-ended questions, or a combination thereof. The user interfaces further include one or more user affordances (e.g., radio buttons, text boxes) for entering answers to the questions and journaling the user's thoughts.

In some embodiments, users of the platform can access the user interfaces via a menu provided by the platform, for example, via a navigation bar in the mobile app. Additionally or alternatively, the platform can automatically provide an entry point to the user interfaces via a notification user interface (e.g., a pop-up window) periodically or in response to a triggering event. The frequency of the automatic notifications can be initially set to default values (e.g., daily between 2-7PM). In some embodiments, the user can specify the frequency of the automatic notifications (e.g., daily, weekly, monthly) as his or her personal setting. Further, the platform can automatically decrease the frequency of the automatic notifications if the user has been inactive (e.g., not opened the mobile app, not made a donation) for an extended period of time.

Exemplary multiple-choice questions can include: "How do you feeling you're doing with your goals?"; "How do you feel about your giving behavior recently?"; "Are you enjoying using Jarous?"; "Do you need help using Jarous?"; "Are you feeling generous today?".

Open-ended questions that may require textual inputs can include: "How do you feel you are doing with your goals?"; "What's the question you're most afraid to be asked?"; "In what ways would you like your next (day/week/month) to be different from the previous one?"; "What have you done to make today a better day for you?"; "What would give your life more meaning?"; "If you didn't care about what anyone thought, what's your most deeply held aspiration?"; "What value resonates with you the most today?"; "What's the most positive thing someone told you today?"; "Have you accomplished as much as you'd hoped to (today/this week/this month/this year?)"; "Who are you?"; "What prevents you from being in the moment?"; "How does it feel to be alone with your thoughts these days?"; "What do you usually think about when there are no distractions?"; "What would give your life more meaning?"; "What's something that makes you unique?"; "What are you passionate about?"; "What are your recent achievements?"; "What are you most grateful for today?"; "What are the most important things in your life?"; "What are your values?"; "What is your ideal self?"; "Are you living your dreams?"; "If you had one day left to live, what would you do?"; "What would you do today if you had no tomorrow?"; "What's the most recent life lesson you've learned?"; "What's the most important life lesson you've learned?"; "What advice would you give yourself 3 years ago?"; "What are you most proud of?"; "What opportunities are you looking for?"; "What are your current goals/dreams?"

Figure 6:
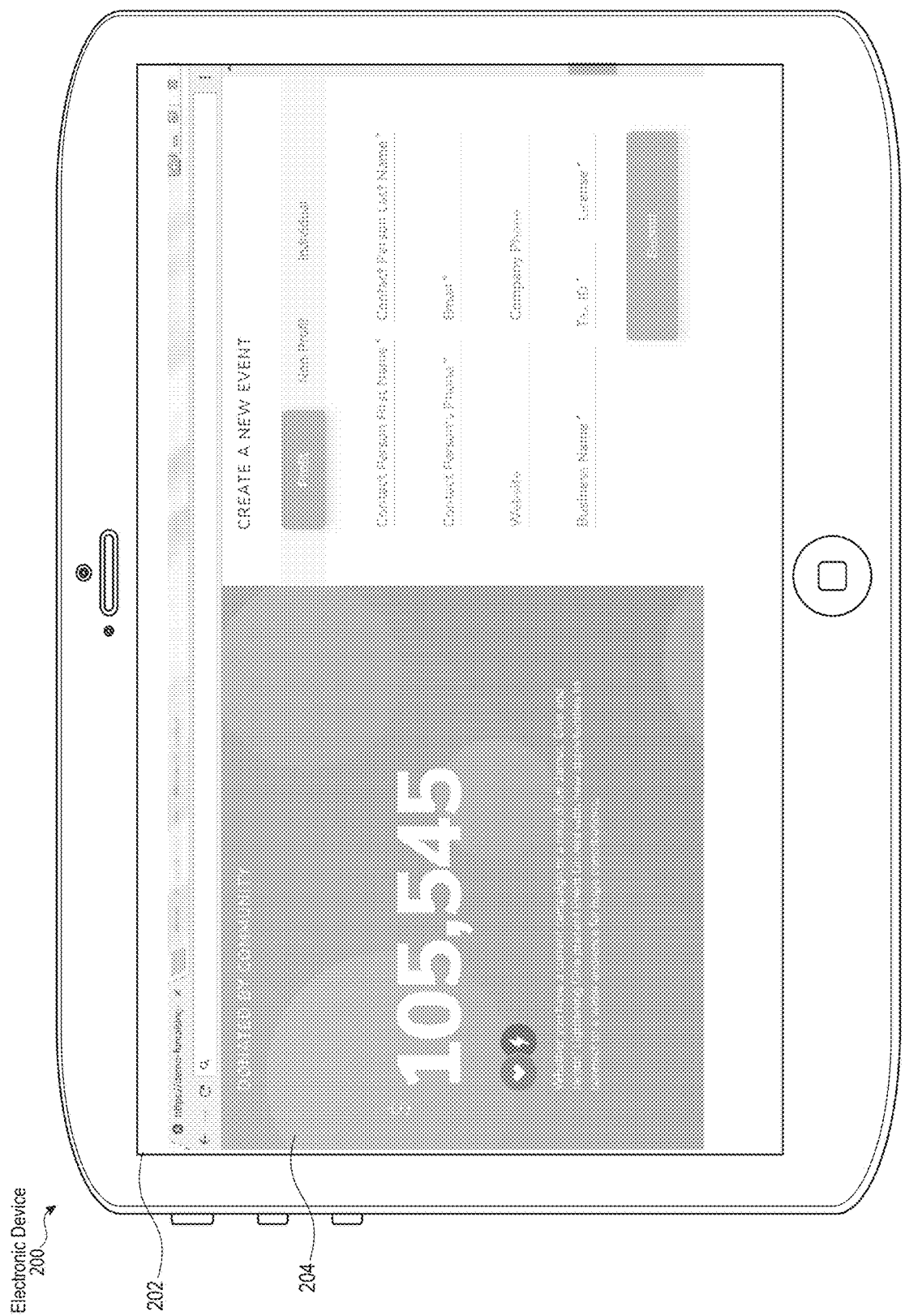
FIG. 6 depicts an exemplary user interface of an electronic device in accordance with some embodiments.

As discussed above, the action-based donation platform allows interaction among three groups of users: individual users, event drivers, and sponsors. For event drivers, the platform provides user interfaces to create, publicize, and manage charitable events. Specifically, an event driver can create an account using the platform and create one or more events under the account. The event driver can add descriptions (e.g., goal, duration) and graphics to event pages and specify necessary information for processing and receiving donations. The user interfaces for creating and managing events can be implemented as a part of a web portal, a mobile application, or a combination thereof. With reference to FIG. 6, the electronic device 200 displays a web portal user interface 204 on a display screen, such as touch-sensitive display screen 202. The web portal user interface 204 allows an event driver to create an account by providing the necessary information, as depicted.

Once an event is created, the event become viewable to individual users. For example, after the electronic device 200 receives user input(s) creating the event using the web portal user interface 204, the electronic device 100 displays a graphical representation of the event in a mobile application (e.g., via user interface 104 and 106 in FIGS. 4A-B) based on the user input received on electronic device 200. The event driver can further publicize the event by reaching out to specific individual users on the platform (e.g., emailing invitation codes). The event driver can continue making updates to the event during and after the donation period. This way, an individual user can view updates associated with the event even after the donation period for the event has closed. In some examples, the platform requires the event driver to participate in a vetting process and pay a fee before being able to create an account and/or create an event on the platform.

In some embodiments, the electronic device provides user interfaces for displaying certain events. For example, the electronic device can display the most popular events as trending events. The popularity of an event can be determined based on the total contributions within the last 24 hours. As another example, the electronic device can display newest events or prompted events, which can be determined based on event driver's actions or machine learning algorithms.

For sponsors, the platform provides user interfaces to sponsor events for event drivers and providing rewards to individual users, thereby creating and/or improving brand name. Specifically, the platform allows a sponsor to search for particular events (e.g., events that are relevant to the industry that the sponsor is in) and provide assistance to the particular events. In some examples, when an event is sponsored, the event page shown to the individual users can include information related to the sponsors (e.g., logo of the sponsors). Further, the platform allows the sponsor to engage with individual users based on the actions of the individual users, for example, by providing a reward to a user who has performed activities that are relevant to the business of the sponsor. In some examples, the platform requires a sponsor to participate in a vetting process and pay a fee before being able to sponsor events on the platform.

Figure 7:
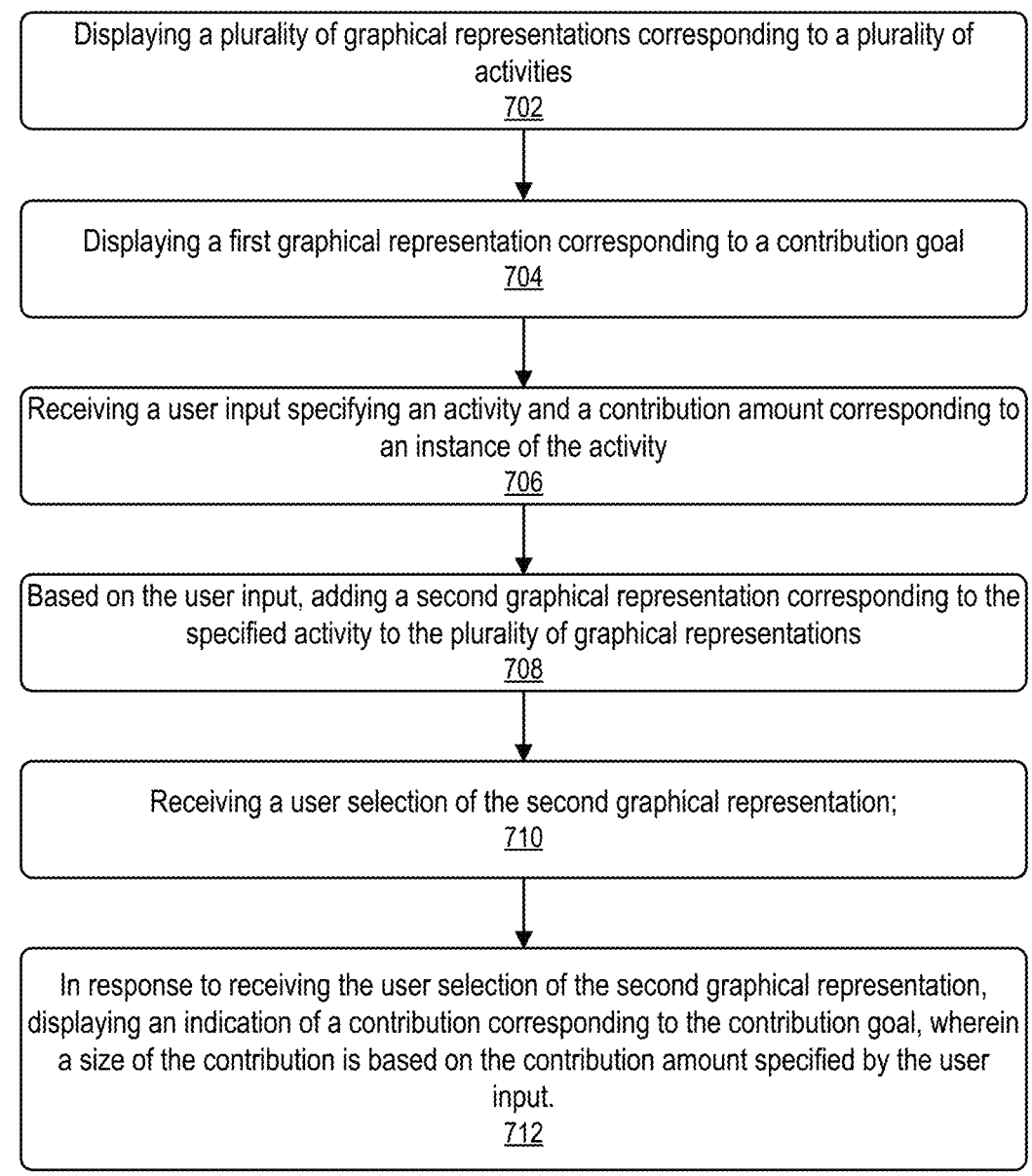
FIG. 7 depicts a block diagram of an exemplary process for providing an action-based donation platform.

FIG. 7 illustrates process 700 for providing an action-based donation platform, according to various examples. Process 700 is performed, for example, using one or more electronic devices implementing a software platform. In some examples, process 700 is performed using a client-server system, and the blocks of process 700 are divided up in any manner between the server and a client device. In other examples, the blocks of process 700 are divided up between the server and multiple client devices. Thus, while portions of process 700 are described herein as being performed by particular devices of a client-server system, it will be appreciated that process 700 is not so limited. In other examples, process 700 is performed using only a client device (e.g., user device 100) or only multiple client devices. In process 700, some blocks are, optionally, combined, the order of some blocks is, optionally, changed, and some blocks are, optionally, omitted. In some examples, additional steps may be performed in combination with the process 700. Accordingly, the operations as illustrated (and described in greater detail below) are exemplary by nature and, as such, should not be viewed as limiting.

At block 702, an electronic device with a display displays a plurality of graphical representations corresponding to a plurality of activities. At block 704, the electronic device displays a first graphical representation corresponding to a contribution goal. At block 706, the electronic device receives a user input specifying an activity and a contribution amount corresponding to an instance of the activity. At block 708, the electronic device, based on the user input, adds a second graphical representation corresponding to the specified activity to the plurality of graphical representations. At block 710, the electronic device receives a user selection of the second graphical representation. At block 712, the electronic device, in response to receiving the user selection of the second graphical representation, displays an indication of a contribution corresponding to the contribution goal. The size of the contribution is based on the contribution amount specified by the user input.

Figure 8:
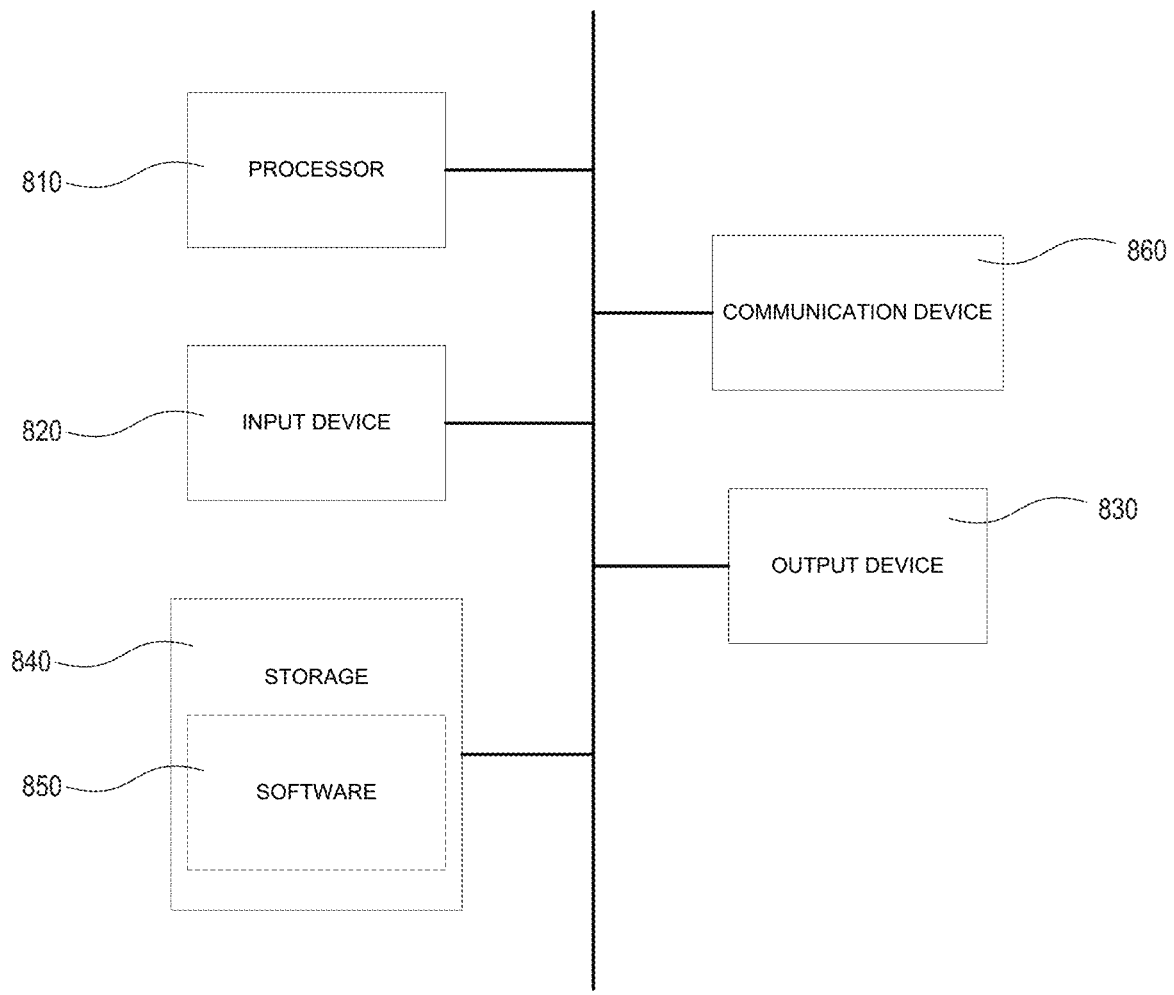
FIG. 8 depicts an exemplary electronic device in accordance with some embodiments.

The operations described above with reference to FIG. 7 are optionally implemented by components depicted in FIG. 8. It would be clear to a person having ordinary skill in the art how other processes are implemented based on the components depicted in FIGS. 1-6 and 8.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, such as a personal computer, workstation, server or handheld computing device (portable electronic device) such as a phone or tablet. The device can include, for example, one or more of processor 810, input device 820, output device 830, storage 840, and communication device 860. Input device 820 and output device 830 can generally correspond to those described above, and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic or optical memory including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-implemented method, comprising:
   displaying, by an electronic device comprising a display and one or more processors, a plurality of graphical representations corresponding to a plurality of activities;

displaying, by the electronic device, a first graphical representation corresponding to a user-selected contribution goal;

receiving, by the electronic device, a user input specifying an activity and a contribution amount, wherein the user-specified contribution amount corresponds to a performance of the user-specified activity;

adding, by the electronic device, a second graphical representation corresponding to the user-specified activity to the plurality of graphical representations;

simultaneously displaying, by the electronic device, the first graphical representation corresponding to the user-selected contribution goal with the plurality of graphical representations corresponding to the plurality of activities including the second graphical representation corresponding to the user-specified activity, wherein the plurality of graphical representations corresponding to the plurality of activities are displayed at a first portion of the display and the first graphical representation corresponding to the user-selected contribution goal is displayed at a second portion of the display;

receiving, by the electronic device, a user selection of the second graphical representation, wherein the user selection of the second graphical presentation indicates the performance of the user-specified activity;

in response to receiving the user selection of the second graphical representation, displaying, by the electronic device, an indication of adding the user-specified contribution amount to the user-selected contribution goal, wherein the indication comprises an animation of an object based on the user-specified contribution amount, and wherein the animation of the object comprises the object moving from the second graphical representation at the first portion of the display into the first graphical representation at the second portion of the display; and automatically modifying, by the electronic device, the first graphical representation, wherein modifying the first graphical representation reflects the adding of the user-specified contribution amount to the user-selected contribution goal.

2. The method of claim 1, wherein the first graphical representation corresponding to the user-selected contribution goal includes a graphical representation of a container.

3. The method of claim 1, wherein an appearance of the object is based on the contribution amount specified by the user input.

4. The method of claim 1, wherein an appearance of the object is based on an appearance of the second graphical representation.

5. The method of claim 1, wherein displaying the indication of the user-specified contribution amount towards the user-selected contribution goal further comprises:
in response to receiving the user selection, determining whether a current amount associated with the user-selected contribution goal meets a first threshold;
in accordance with a determination that the current amount meets the first threshold, displaying a first indication of the user-specified contribution amount; and
in accordance with a determination that the current amount does not meet the first threshold, displaying a second indication of the user-specified contribution amount, wherein the second indication is different from the first indication.

6. The method of claim 1, wherein displaying the indication of the user-specified contribution amount towards the user-selected contribution goal further comprises:
in response to receiving the user selection, determining whether a current amount associated with the user-selected contribution goal meets a second threshold;
in accordance with a determination that the current amount meets the second threshold, displaying a prompt for a donation amount; and
in accordance with a determination that the current amount does not meet the second threshold, displaying the indication of the user-specified contribution amount.

7. The method of claim 1, further comprising:
receiving a user input specifying a donation amount and a target event; and
in response to receiving the user input:
decrementing a current amount associated with the user-selected contribution goal with the donation amount; and
incrementing an amount associated with the target event with the donation amount.

8. The method of claim 7, further comprising:
receiving a user input selecting a contribution goal from a plurality of contribution goals.

9. The method of claim 7, further comprising:
in response to receiving the user input, displaying an indication that a donation amount corresponding to the user-selected contribution goal is made.

10. The method of claim 1, further comprising:
receiving, by a first electronic device, a user input specifying a donation amount and a target event;
in response to receiving the user input specifying a donation amount and a target event, providing, by a second electronic device different from the first electronic device, a prompt for authorizing the donation amount.

11. The method of claim 1, wherein the user input is a first user input, wherein the user-specified activity is a first activity, and wherein the user-specified contribution amount is a first contribution amount, the method further comprising:
receiving, by the electronic device, a second user input specifying a second activity and a second contribution amount, wherein the second user-specified contribution amount corresponds to a performance of the second user-specified activity;
adding, by the electronic device, a third graphical representation corresponding to the second user-specified activity to the plurality of graphical representations;
receiving, by the electronic device, a user selection of the third graphical representation, wherein the user selection of the third graphical presentation indicates the performance of the second user-specified activity;
in response to receiving the user selection of the third graphical representation, displaying, by the electronic device, an indication of adding the second user-specified contribution amount to the user-selected contribution goal, wherein the indication comprises an animation of an object based on the second user-specified contribution amount, and wherein the animation of the object comprises the object moving from the third graphical representation at the first portion of the display into the first graphical representation at the second portion of the display; and
automatically modifying, by the electronic device, the first graphical representation, wherein modifying the first graphical representation reflects the adding of the second user-specified contribution amount to the user-selected contribution goal.

12. The method of claim 1, further comprising:
displaying a plurality of contribution goals including a first contribution goal and a second contribution goal, wherein the first contribution goal is associated with a first plurality of users, and wherein the second contribution goal is associated with a second plurality of user different from the first plurality of users.

13. The method of claim 1, further comprising:
receiving, by a first electronic device, a user input creating an event on a web portal; and
based on the user input received by the first electronic device, displaying a graphical representation of the event on a mobile application by a second electronic device.

14. The method of claim 13, wherein displaying the graphical representation of the event comprises:
displaying the graphical representation of the event based on one or more settings associated with a user of the second electronic device.

15. The method of claim 1, wherein the electronic device is a portable device.

16. An electronic device, comprising:
a display, one or more processors, a memory, and one or more programs, wherein the one or more programs are stored in the memory and configured to be executed by the one or more processors, the one or more programs including instructions for:
displaying a plurality of graphical representations corresponding to a plurality of activities;
displaying a first graphical representation corresponding to a user-selected contribution goal;
receiving a user input specifying an activity and a contribution amount, wherein the user-specified contribution amount corresponds to a performance of the user-specified activity;
adding a second graphical representation corresponding to the user-specified activity to the plurality of graphical representations;
simultaneously displaying the first graphical representation corresponding to the user-selected contribution goal with the plurality of graphical representations corresponding to the plurality of activities including the second graphical representation corresponding to the user-specified activity, wherein the plurality of graphical representations corresponding to the plurality of activities are displayed at a first portion of the display and the first graphical representation corresponding to the user-selected contribution goal is displayed at a second portion of the display;
receiving a user selection of the second graphical representation, wherein the user selection of the second graphical representation indicates the performance of the user-specified activity;
in response to receiving the user selection of the second graphical representation, displaying an indication of adding the user-specified contribution amount to the user-selected contribution goal, wherein the indication comprises an animation of an object based on the user-specified contribution amount, and wherein the animation of the object comprises the object moving from the second graphical representation at the first portion of the display into the first graphical representation at the second portion of the display; and
automatically modifying, by the electronic device, the first graphical representation, wherein modifying the first graphical representation reflects the adding of the user-specified contribution amount to the user-selected contribution goal.

17. The electronic device of claim 16, wherein the user input is a first user input, wherein the user-specified activity is a first activity, wherein the user-specified contribution amount is a first contribution amount, and wherein the one or more programs further include instructions for:
receiving a second user input specifying a second activity and a second contribution amount, wherein the second user-specified contribution amount corresponds to a performance of the second user-specified activity;
adding a third graphical representation corresponding to the second user-specified activity to the plurality of graphical representations;
receiving a user selection of the third graphical representation, wherein the user selection of the third graphical presentation indicates the performance of the second user-specified activity;
in response to receiving the user selection of the third graphical representation, displaying an indication of adding the second user-specified contribution amount to the user-selected contribution goal, wherein the indication comprises an animation of an object based on the second user-specified contribution amount, and wherein the animation of the object comprises the object moving from the third graphical representation at the first portion of the display into the first graphical representation at the second portion of the display; and
automatically modifying the first graphical representation, wherein modifying the first graphical representation reflects the adding of the second user-specified contribution amount to the user-selected contribution goal.

18. The electronic device of claim 16, wherein the electronic device is a portable device.

19. A non-transitory computer-readable storage medium storing one or more programs, the one or more programs comprising instructions, which when executed by one or more processors of an electronic device having a display, cause the electronic device to:
display a plurality of graphical representations corresponding to a plurality of activities;
display a first graphical representation corresponding to a user-selected contribution goal;
receive a user input specifying an activity and a contribution amount, wherein the user-specified contribution amount corresponds to a performance of the user-specified activity;
add a second graphical representation corresponding to the user-specified activity to the plurality of graphical representations;
simultaneously display the first graphical representation corresponding to the user-selected contribution goal with the plurality of graphical representations corresponding to the plurality of activities including the second graphical representation corresponding to the user-specified activity, wherein the plurality of graphical representations corresponding to the plurality of activities are displayed at a first portion of the display and the first graphical representation corresponding to the user-selected contribution goal is displayed at a second portion of the display;

receive a user selection of the second graphical representation, wherein the user selection of the second graphical presentation indicates the performance of the user-specified activity;

in response to receiving the user selection of the second graphical representation, display an indication of adding the user-specified contribution amount to the user-selected contribution goal, wherein the indication comprises an animation of an object based on the user-specified contribution amount, and wherein the animation of the object comprises the object moving from the second graphical representation at the first portion of the display into the first graphical representation at the second portion of the display; and automatically modify the first graphical representation, wherein modifying the first graphical representation reflects the adding of the user-specified contribution amount to the user-selected contribution goal.

20. The non-transitory computer-readable storage medium of claim 19, wherein the user input is a first user input, wherein the user-specified activity is a first activity, wherein the user-specified contribution amount is a first contribution amount, and wherein the one or more programs comprising instructions, which when executed by one or more processors of an electronic device, cause the electronic device further to:

receive a second user input specifying a second activity and a second contribution amount, wherein the second user-specified contribution amount corresponds to a performance of the second user-specified activity;

add a third graphical representation corresponding to the second user-specified activity to the plurality of graphical representations;

receive a user selection of the third graphical representation, wherein the user selection of the third graphical presentation indicates the performance of the second user-specified activity;

in response to receiving the user selection of the third graphical representation, display an indication of adding the second user-specified contribution amount to the user-selected contribution goal, wherein the indication comprises an animation of an object based on the second user-specified contribution amount, and wherein the animation of the object comprises the object moving from the third graphical representation at the first portion of the display into the first graphical representation at the second portion of the display; and automatically modify the first graphical representation, wherein modifying the first graphical representation reflects the adding of the second user-specified contribution amount to the user-selected contribution goal.

\* \* \* \* \*